United States Patent
Zhu et al.

(10) Patent No.: US 12,267,933 B1
(45) Date of Patent: Apr. 1, 2025

(54) LAMP AND CONTROLLER THEREOF, AND LIGHTING EFFECT COORDINATED PLAYBACK METHOD AND DEVICE

(71) Applicant: Shenzhen Intellirocks Tech. Co., Ltd., Shenzhen (CN)

(72) Inventors: Jiajun Zhu, Shenzhen (CN); Wenlong Wu, Shenzhen (CN)

(73) Assignee: Shenzhen Intellirocks Tech. Co., Ltd., Shenzhen (CN)

( * ) Notice: Subject to any disclaimer, the term of this patent is extended or adjusted under 35 U.S.C. 154(b) by 0 days.

(21) Appl. No.: 18/896,064

(22) Filed: Sep. 25, 2024

(30) Foreign Application Priority Data

Nov. 2, 2023 (CN) .......................... 202311443978.0

(51) Int. Cl.
*H05B 47/17* (2020.01)
*H05B 45/20* (2020.01)
*H05B 47/16* (2020.01)
*H05B 47/165* (2020.01)
*H05B 47/175* (2020.01)

(52) U.S. Cl.
CPC .............. *H05B 47/17* (2020.01); *H05B 45/20* (2020.01); *H05B 47/16* (2020.01); *H05B 47/165* (2020.01); *H05B 47/1965* (2024.01)

(58) Field of Classification Search
CPC ........ H05B 47/17; H05B 45/20; H05B 47/16; H05B 47/165; H05B 47/1965
See application file for complete search history.

(56) References Cited

U.S. PATENT DOCUMENTS

| 10,728,979 B1* | 7/2020 | Suttles | H05B 45/20 |
| 2017/0362840 A1* | 12/2017 | Paul | H05B 45/20 |

FOREIGN PATENT DOCUMENTS

CN 113613369 A 11/2021

OTHER PUBLICATIONS

You et al., English Translation of CN113613369A, "Light effect control method and device, equipment and storage medium", Nov. 2021, pp. 1-22. (Year: 2021).*

* cited by examiner

*Primary Examiner* — Daniel D Chang
(74) *Attorney, Agent, or Firm* — Wenye Tan

(57) ABSTRACT

A lighting-effect coordinated playback method for an ambient lamp includes: obtaining a target lighting-effect including at least one sub-frame lighting-effect to be played by multiple light strips, and determining a lighting-effect coordination mode and a sub-frame duration of the target lighting-effect; determining a light strip group to which each light strip belongs according to the lighting-effect coordination mode, and determining a refresh time slot of each light strip relative to the sub-frame duration according to a total number of lighting units of the light strip contained in each light strip group; and according to the corresponding refresh time slot of each light strip, sending frame-slice control data of each frame slice of the light strip corresponding to the frame lighting-effect to the corresponding light strip at intervals, so as to control the light units of each corresponding light strip to coordinately complete playback of the sub-frame lighting-effect.

13 Claims, 5 Drawing Sheets

---

Obtaining a target lighting-effect to be played by multiple light strips, determining a lighting-effect coordination mode and sub-frame duration of the target lighting-effect, the target lighting-effect including a plurality of sub-frame lighting-effects, and the sub-frame duration is used to define the theoretical playback duration of the sub-frame (i.e., a frame slice) for the corresponding sub-frame lighting-effect, so as to serve as a reference for determining the refresh time slot of each of the light strips — S5100

Determining the light strip group to which each light strip in the current ambient lamp belongs according to the lighting-effect coordination mode, and determining the refresh time slot of each light strip relative to the sub-frame duration according to the total number of lighting units of the light strip contained in each light strip group — S5200

According to the corresponding refresh time slot of each light strip, sending the frame-slice control data of each frame slice of the light strip corresponding to the sub-frame lighting-effect to the corresponding light strip at intervals, so as to control the light-emitting units of each corresponding light strip to cooperate in completing the playback of the sub-frame lighting-effect — S5300

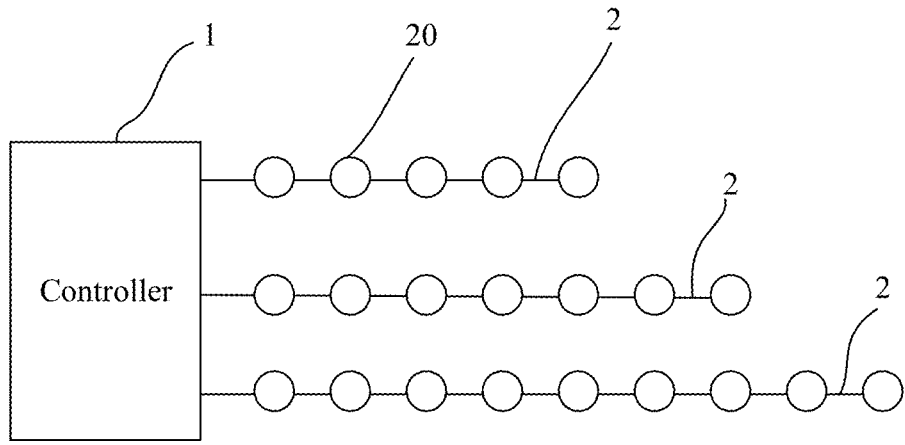

FIG. 1

| Obtaining a target lighting-effect to be played by multiple light strips, determining a lighting-effect coordination mode and sub-frame duration of the target lighting-effect, the target lighting-effect including a plurality of sub-frame lighting-effects, and the sub-frame duration is used to define the theoretical playback duration of the sub-frame (i.e., a frame slice) for the corresponding sub-frame lighting-effect, so as to serve as a reference for determining the refresh time slot of each of the light strips | S5100 |

↓

| Determining the light strip group to which each light strip in the current ambient lamp belongs according to the lighting-effect coordination mode, and determining the refresh time slot of each light strip relative to the sub-frame duration according to the total number of lighting units of the light strip contained in each light strip group | S5200 |

↓

| According to the corresponding refresh time slot of each light strip, sending the frame-slice control data of each frame slice of the light strip corresponding to the sub-frame lighting-effect to the corresponding light strip at intervals, so as to control the light-emitting units of each corresponding light strip to cooperate in completing the playback of the sub-frame lighting-effect | S5300 |

FIG. 2

```
┌─────────────────────────────────────────────────────────────────────┐
│ Identifying the lighting-effect coordination mode in the target     │──S5210
│ lighting-effect, the lighting-effect coordination mode being any    │
│ one of the following modes: a synchronous playback mode, and a      │
│ sequential playback mode                                            │
└─────────────────────────────────────────────────────────────────────┘
                                  ↓
┌─────────────────────────────────────────────────────────────────────┐
│ When the lighting-effect coordination mode is the synchronous       │──S5220
│ playback mode, each light strip of the current ambient lamp is      │
│ respectively regarded as an independent light strip group, and the  │
│ refresh time slot corresponding to the sub-frame duration of each   │
│ light strip is determined according to the total number of lighting │
│ units of the light strip of each light strip group                  │
└─────────────────────────────────────────────────────────────────────┘
                                  ↓
┌─────────────────────────────────────────────────────────────────────┐
│ When the lighting-effect coordination mode is the sequential        │──S5230
│ playback mode, the various light strips of the current ambient lamp │
│ are orderly combined as a single light strip group, and the refresh │
│ time slots of all the light strips as a whole corresponding to the  │
│ sub-frame duration are determined according to the total number of  │
│ lighting units of all the light strips in the light strip group     │
└─────────────────────────────────────────────────────────────────────┘
```

FIG. 4

```
┌─────────────────────────────────────────────────────────────────────┐
│ Obtaining the number of lighting units of all light strips in the   │──S5221
│ current ambient lamp as the total number of lighting units of the   │
│ independent light strip group to which the corresponding light      │
│ strip belongs                                                       │
└─────────────────────────────────────────────────────────────────────┘
                                  ↓
┌─────────────────────────────────────────────────────────────────────┐
│ Taking the total number of lighting units of one of the light strip │──S5222
│ groups as the reference, determining a number ratio of the total    │
│ number of lighting units of each light strip group relative to the  │
│ reference                                                           │
└─────────────────────────────────────────────────────────────────────┘
                                  ↓
┌─────────────────────────────────────────────────────────────────────┐
│ Determining the product of the number ratio of each light strip     │──S5223
│ group and the sub-frame duration as the refresh time slot of the    │
│ light strip in the corresponding light strip group, and configuring │
│ the start time difference between the refresh time slots of the     │
│ lighting units to be zero time difference                           │
└─────────────────────────────────────────────────────────────────────┘
```

FIG. 5

LAMP AND CONTROLLER THEREOF, AND LIGHTING EFFECT COORDINATED PLAYBACK METHOD AND DEVICE

CROSS-REFERENCES TO RELATED APPLICATIONS

This application claims priority to Chinese Patent Application No. CN2023114439780, filed on Nov. 2, 2023, the content of which is hereby incorporated by reference in entirety.

FIELD OF THE TECHNOLOGY

The present disclosure relates to the technical field of lighting technology and, specifically, to a lamp and controller thereof, and a lighting-effect coordinated playback method and device.

BACKGROUND OF THE DISCLOSURE

Lamps are mainly used to decorate the atmosphere of spaces and also have lighting functions. They are widely used, their degree of intelligence is getting higher and higher, and their functions are constantly developing to adapt to different needs.

Control of the light emission of an lamp is mostly through a controller driving a single light strip. Each light strip is composed of multiple lighting units connected in a tree or line shape, and a lighting unit is a point-light-source lamp bead. When defining the lighting-effect of this kind of atmosphere lamp, the corresponding design is made according to the layout of the light strip. The controller in the atmosphere lamp converts the lighting-effect into corresponding control data and transmits the control data to each lighting unit in the light strip. The corresponding lighting-effect is then presented through the coordinated work of individual lamp beads.

With the developing requirements of their application, for the traditional lamps, the product design based on a single light strip can no longer meet the actual needs. The present disclosure explores solutions of coordinated work of multiple light strips.

The disclosed methods and apparatus are directed to solve one or more problems set forth above and other problems.

SUMMARY

Embodiments of the present disclosure provides a lamp and controller thereof, and a lighting-effect coordinated playback method and device.

According to one aspect of the present disclosure, a lighting-effect coordinated playback method is provided. The method includes: obtaining a target lighting-effect to be played by multiple light strips, and determining a lighting-effect coordination mode and sub-frame duration of the target lighting-effect. The target lighting-effect includes at least one sub-frame lighting-effect, and the sub-frame duration is used to define a theoretical playback duration of a frame slice of a sub-frame lighting-effect, so as to serve as a reference for determining a refresh time slot of each light strip. The method also includes: identifying the lighting-effect coordination mode in the target lighting-effect, the lighting-effect coordination mode being one of a synchronous playback mode and a sequential playback mode, and according to the corresponding refresh time slot of each light strip, sending frame-slice control data of each frame slice of the light strip corresponding to the frame lighting-effect to the corresponding light strip at intervals, so as to control the light units of each corresponding light strip to coordinately complete playback of the sub-frame lighting-effect. The determining the refresh time slots of each light strip relative to the sub-frame duration according to a total number of lighting units of the light strips contained in each light strip group, includes: when the lighting-effect coordination mode is the synchronous playback mode, respectively regarding the light strips of the current ambient lamp as independent light strip groups, and determining the refresh time slots of each light strip corresponding to the sub-frame duration according to the total number of light units of the light strips of each light strip group; when the lighting-effect coordination mode is the sequential playback mode, orderly combining the light strips of the current ambient lamp as a single light strip group, and determining the refresh time slots of all the light strips as a whole corresponding to the sub-frame duration according to the total number of light units of all the light strips in the light strip group. The method also includes: according to the corresponding refresh time slot of each light strip, sending frame-slice control data of each frame slice of the light strip corresponding to the frame lighting-effect to the corresponding light strip at intervals, so as to control the light units of each corresponding light strip to coordinately complete playback of the sub-frame lighting-effect.

According to another aspect of the present disclosure, a lamp controller is provided. The lamp controller includes at least one processer, and a memory. The processor is used to call and execute a computer program stored in the memory to perform steps of the lighting-effect coordinated playback method, and the method includes: obtaining a target lighting-effect to be played by multiple light strips, and determining a lighting-effect coordination mode and sub-frame duration of the target lighting-effect, wherein the target lighting-effect includes at least one sub-frame lighting-effect, and the sub-frame duration is used to define a theoretical playback duration of a frame slice of a sub-frame lighting-effect, so as to serve as a reference for determining a refresh time slot of each light strip. The method also includes: identifying the lighting-effect coordination mode in the target lighting-effect, the lighting-effect coordination mode being one of a synchronous playback mode and a sequential playback mode, and according to the corresponding refresh time slot of each light strip, sending frame-slice control data of each frame slice of the light strip corresponding to the frame lighting-effect to the corresponding light strip at intervals, so as to control the light units of each corresponding light strip to coordinately complete playback of the sub-frame lighting-effect. The determining the refresh time slots of each light strip relative to the sub-frame duration according to a total number of lighting units of the light strips contained in each light strip group, includes: when the lighting-effect coordination mode is the synchronous playback mode, respectively regarding the light strips of the current ambient lamp as independent light strip groups, and determining the refresh time slots of each light strip corresponding to the sub-frame duration according to the total number of light units of the light strips of each light strip group; when the lighting-effect coordination mode is the sequential playback mode, orderly combining the light strips of the current ambient lamp as a single light strip group, and determining the refresh time slots of all the light strips as a whole corresponding to the sub-frame duration according to the total number of light units of all the light strips in the light strip group. The method also includes: according to the corresponding refresh time slot of each light strip, sending frame-slice control data of each frame slice of the light strip corresponding to the frame lighting-effect to the corresponding light strip at intervals, so as to control the light units of each corresponding light strip to coordinately complete playback of the sub-frame lighting-effect.

Compared to the prior art, the present disclosure has various technical advantages, including but not limited to: firstly, based on the lighting-effect coordination mode in the target lighting-effect to be played, the present disclosure groups multiple light strips in the lamp to obtain one or more light strip groups, so that each light strip in the lamp has its subordinate light strip group, and then, taking the light strip group as a unit, according to the total number of lighting units constituted by the light strips contained in each light strip group, the refresh time slot of the light strips in the corresponding light strip group is determined. When determining the refresh time slot, the total number of lighting units contained in each light strip group is used as a reference, and the corresponding refresh time slot of the light strip in each light strip group is determined on the basis of the sub-frame duration of the target lighting-effect. The role of the refresh time slot is actually to slice each sub-frame lighting-effect in the target lighting-effect to obtain sub-frame slices. Subsequently, according to the refresh time slot interval of each light strip, the frame-slice control data of the corresponding sub-frame slice is sent to the light strip, so that the target lighting-effect can be presented through the coordinated playback of all light strips, meeting the technical update requirements of the atmosphere lighting in new application scenarios.

Secondly, when determining the refresh time slot corresponding to each light strip, the present disclosure uses the light strip group as an intermediate conversion component to play the role of algorithm standardization. As long as the corresponding lighting-effect coordination mode is specified for various lighting-effects, the corresponding refresh time slot can be determined for each light strip in the lamp by the same algorithm implemented in the present disclosure. From the perspective of a frame lighting-effect, it is actually to implement the corresponding slicing operation of this frame lighting-effect corresponding to different light strips through the light strip group, so that regardless of whether the number of lighting units of different light strips is equal, the refresh time slots can be determined by referring to the same frame slicing time duration. Through each light strip according to its corresponding refresh time slot slicing control, one or more frame lighting-effects can be played in coordination, thereby achieving the target lighting-effect. In this process, it is more efficient to determine the refresh time slot based on the light strip group, and because the refresh time slot is calculated and determined based on the number of lighting units of each light strip, the refresh time slot is more accurate. Naturally, when the slicing control is implemented according to the refresh time slot, the lighting-effect obtained is also in line with expectations and coordinated and unified.

In addition, the technical solution of the present application enables the lamp to coordinate the operation of multiple light strips connected to the controller in parallel through a single controller, providing underlying technical support for evolution in the product form of the ambient lamps, helping to optimize the product experience, and promoting the marketing of the products.

Other aspects of the present disclosure can be understood by those skilled in the art in light of the description, the claims, and the drawings of the present disclosure. The summary is not intended to limit the scope of any embodiments described.

BRIEF DESCRIPTION OF THE DRAWINGS

To describe the technical solutions of the embodiments of the present disclosure more clearly, the following briefly introduces the accompanying drawings used for describing the disclosed embodiments. Apparently, the accompanying drawings in the following description show merely some embodiments of the present disclosure, and a person of ordinary skill in the technology may derive other drawings from these accompanying drawings without creative efforts.

FIG. 1 illustrates a schematic diagram of an electrical structure of an ambient lamp according to an embodiment of the present disclosure;

FIG. 2 illustrates a flow chart of a lighting-effect coordinated playback method according to an embodiment of the present disclosure;

FIG. 4 illustrates a flow chart of distinguishing different lighting-effect coordination modes to determine the refresh time slot of the light strip according to an embodiment of the present disclosure;

FIG. 5 illustrates a flow chart of determining the refresh time slot of the light strip in the synchronous playback mode according to an embodiment of the present disclosure;

DETAILED DESCRIPTION

Figure 3:
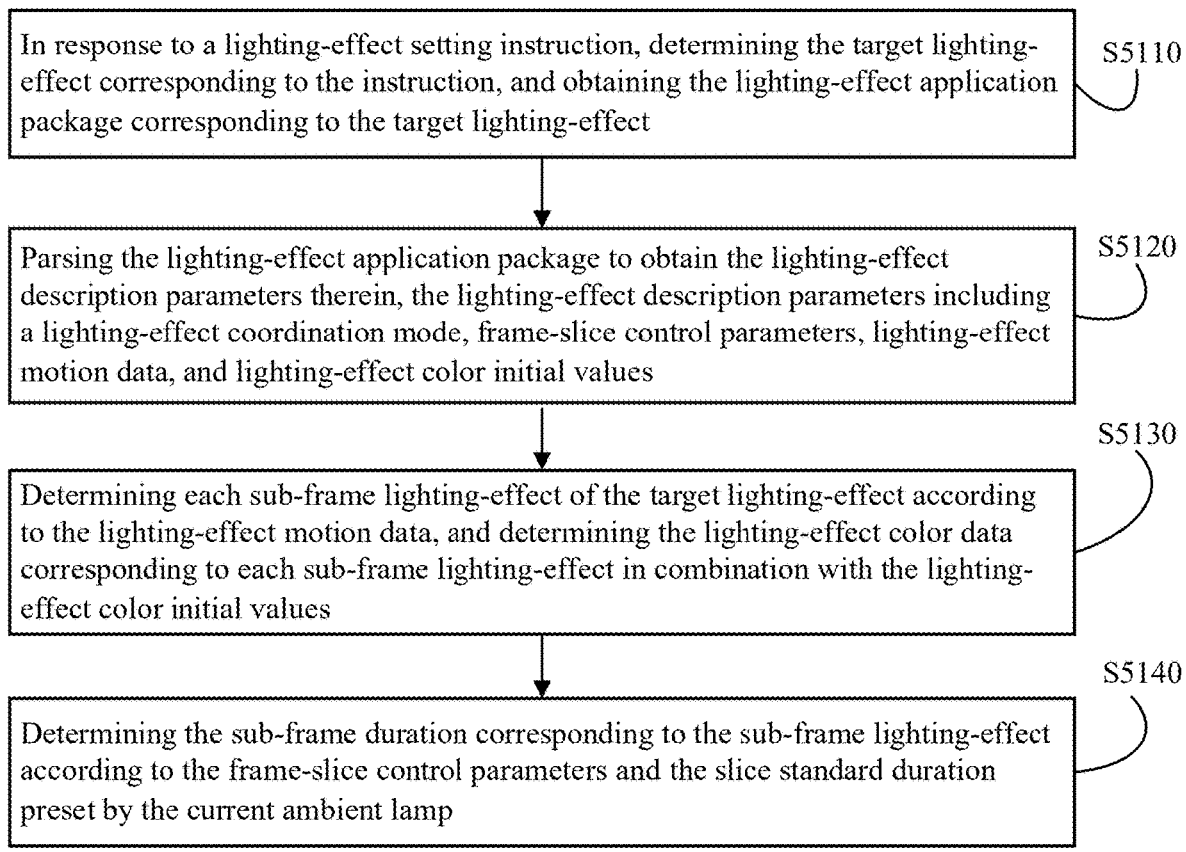
FIG. 3 illustrates a flow chart of obtaining a lighting-effect application package according to an embodiment of the present disclosure.

FIG. 1 illustrates an ambient lamp according to an embodiment of the present disclosure. As shown in FIG. 1, the ambient lamp may include a lamp body (not shown) and a lamp circuit supported by the lamp body. The lamp circuit includes a controller 1 and multiple light strips 2. Each light strip 2 includes multiple lighting units 20, and the number of lighting units 20 of each light strip 2 may be not equal. Similarly, three or more light strips 2 can be set, which can be configured according to actual needs. Each light strip 2 is independently connected to the controller 1, so that the controller 1 can independently control the single light strip 2.

The shape of the lamp body of the ambient lamp can be flexibly designed, and different light strips 2 can be distributed in different parts of the lamp body, so as to achieve the distance between different light strips 2. For example, the lamp body can be set to be conical, narrow at the top and wide at the bottom, and the first light strip is laid in a ring at the top, and the second light strip is laid in a ring at the bottom, so that there are light strips on both the top and the bottom for playing lighting effects. Of course, the product form can also be designed in other ways, which does not affect the creative spirit of the present disclosure.

The light strip 2 includes a plurality of light-emitting units 20, which are sequentially connected in series. Each light-emitting unit 20 is provided with a corresponding control chip and a lamp bead. The control chip of the light-emitting unit 20 is used to parse the corresponding frame-slice control data and generate a corresponding light control signal, and the corresponding lamp bead is controlled by the light control signal to emit light according to specific color data. In some embodiments, the lamp bead can be an LED lamp that can emit various colors of light, and the various colors of light can be the three primary colors of red, green and blue. In certain embodiments, a separate LED lamp corresponding to white light can also be added.

The controller 1 in the ambient lamp usually includes a control chip, and a communication component, etc. The controller 1 may be used to realize the operational control of the entire ambient lamp and is responsible for the communication inside and outside the entire ambient lamp, such as receiving a lighting-effect application package of a target lighting-effect from an external device, providing a user with a selected stored lighting-effect application package, parsing the lighting-effect application package into one or more lighting-effect description parameters of a frame sliced lighting-effect, and sending corresponding frame-slice control data to each light strip 2, etc. The external device communicating with the controller 1 can be a terminal device such as a mobile phone, a tablet computer, a personal computer, a remote control, etc., which has corresponding applications installed and running. The applications installed and running are suitable for communicating with the controller 1 to realize various functions.

The control chip in the controller 1 and the control chip used in the light-emitting unit 20 can be realized by various embedded chips, such as Bluetooth SoC (System on Chip) with built-in communication components, WiFi SoC, etc., MCU (Micro Controller Unit) with additional communication components, DSP (Digital Signal Processor) and other chips. The control chip usually includes a central processing unit and a memory, which is mainly used to store and execute program instructions to realize corresponding functions. The communication component can be used for wireless or wired communication with external devices. For example, the control chip in the controller 1 can communicate with various intelligent terminal devices such as personal computers and smart phones, so that users can transmit lighting-effect application packages to ambient lamps through terminal devices.

After the control chip receives a lighting-effect application package through the communication component, the application package can be parsed into frame-slice control data for controlling each light-emitting unit 20 of the ambient lamp, which can be outputted to each light-emitting unit 20 to control the corresponding lamp bead(s) in each light-emitting unit 20 to play or display the lighting-effect in coordination.

In some embodiments, the ambient lamp can also be configured with a power adapter, a control panel, and a display screen, etc., as needed. The power adapter is mainly used to convert the outlet power into direct current to power the entire ambient lamp. The control panel usually provides one or more buttons for implementing switch control on the controller 1, etc. The display screen can be used to display various control information so as to cooperate with the buttons on the control panel to support the realization of human-computer interaction functions. In some embodiments, the control panel can be integrated with the display screen into the same touch screen.

The lighting-effect referred in the present disclosure can be defined in any external device, and then encapsulated into a lighting-effect application package and transmitted to the controller 1 of the ambient lamp for parsing and applying. The lighting-effect can include one or more sub-frame lighting-effects, and multiple sub-frame lighting-effects can be played successively in a time sequence, and multiple sub-frame lighting-effects can jointly complete the display of an overall lighting-effect. In the lighting-effect application package, the information defining the lighting-effect in the external device is encapsulated as lighting-effect description parameters, which can be flexibly constructed to adapt to the protocol between the ambient lamps, so that the lighting-effect description parameters can be used to describe each sub-frame lighting-effect in the lighting-effect by multiple specific parameters.

The lighting-effect coordinated playback method of the present disclosure can be implemented as a computer program product, which is installed in the controller of the ambient lamp to run, so as to control each light strip in the ambient lamp to coordinately play or present the target lighting-effect.

In the process of exploring solutions, it is found that controlling multiple light strips to coordinate the lighting-effects often faces more sophisticated technical challenges, mainly reflected in the problem of standardized interaction between the lighting-effect customization end and the lamp application end. For example, when users customize lighting-effects on terminal devices, they usually define them based on the description of the intuitive effects of the lighting-effects. On the lamp side, when there are multiple light strips, they need to face the problem of how to coordinate the lighting-effects. On the surface, it is a problem of dealing with the coordination relationship of multiple light strips, but at the technical level, it requires more refined and systematic thinking, otherwise the lighting-effects often will not work properly on such products.

FIG. 2 illustrates a flow chart of a lighting-effect coordinated playback method according to an embodiment of the present disclosure. In certain embodiments, the overall lighting-effect for the ambient lamp during a period of time can be considered as a frame lighting-effect, and the overall lighting-effect can be divided into a plurality of lighting-effects for each of the light strips (and/or light strip group). The divided lighting-effect for each light strip or light strip group can be considered as a slice of the frame lighting-effect (a frame slice of lighting-effect) or a sub-frame lighting-effect, and each sub-frame lighting-effect has a sub-frame duration or frame slice duration, which may define the time duration to playback the corresponding sub-frame lighting-effect by each light strip or light strip group. Further, because the sub-frame lighting-effects can be played in a sequence, each light strip or light strip group has a refresh time slot, which defines when or how long the corresponding sub-frame lighting-effect is played by the light strip or light strip group. As shown in FIG. 2, the lighting-effect coordinated playback method may include the followings.

S5100, obtaining a target lighting-effect to be played by multiple light strips in an ambient lamp, determining a lighting-effect coordination mode and sub-frame duration of the target lighting-effect, the target lighting-effect including a plurality of sub-frame lighting-effects, and the sub-frame duration is used to define the theoretical playback duration of the sub-frame (i.e., frame slice) for the corresponding sub-frame lighting-effect, so as to serve as a reference for determining the refresh time slot of each of the light strips.

When an ambient lamp starts to work as the current ambient lamp, the controller of the current atmosphere lighting-effect can first call or obtain a target lighting-effect to start operation, so as to control the multiple light strips installed in the current ambient lamp to coordinate the playback of the target lighting-effect. In the present disclosure, the number of light strips installed in an ambient lamp is two or more, which can be configured as needed.

The target lighting-effect can be defined by a lighting-effect application package, and a target lighting-effect can have one or more sub-frame lighting-effects. Each sub-frame lighting-effect can usually be played in succession, so the processes described in the present disclosure can be executed for each sub-frame lighting-effect to realize the playback control of the corresponding sub-frame lighting-effect.

In one embodiment, the controller of the current atmosphere lighting-effect may first receive a lighting-effect application package from an external device, parse the lighting-effect application package to obtain the lighting-effect description parameters therein, and then start the lighting-effect playback process. Each frame lighting-effect may be described by a set of corresponding lighting-effect description parameters, or the lighting-effect description parameters may be stored in a local memory for usage. Thus, in one embodiment, when the current ambient lamp needs to play the target lighting-effect, the corresponding lighting-effect description parameters may be directly called from the memory to start the lighting-effect playback process.

For each target lighting-effect, its corresponding lighting-effect coordination mode and sub-frame duration may be determined.

The lighting-effect coordination mode is used to specify the coordination relationship between multiple light strips in the ambient lamp during playback, and may include a synchronous playback mode and a sequential playback mode, etc. The synchronous playback mode indicates that each light strip in the ambient lamp works synchronously to play the sub-frame lighting-effect simultaneously, and the sequential playback mode indicates that each light strip in the ambient lamp works sequentially in a certain order to play the sub-frame lighting-effect sequentially. The lighting-effect coordination mode can be determined by the user for the target lighting-effect by issuing instructions to the controller of the current ambient lamp, or it can be pre-set in the lighting-effect application package of the target lighting-effect.

The sub-frame duration is used to define the theoretical playback duration of each frame slice or sub-frame of the frame lighting-effect. In one embodiment, it can be standardized in advance. In another embodiment, a standard frame duration can be provided, and a slice control parameter can be associated with the standard frame duration for reference and adjustment to obtain the corresponding sub-frame duration. As a theoretical playback duration, the sub-frame duration can be regarded as the sub-frame duration corresponding to the light strip as the main light strip in the current ambient lamp. The sub-frame duration can be used as a reference for each light strip to set its refresh frequency, so that each light strip can be associated with the sub-frame duration to determine the corresponding refresh time slot.

Step S5200, determining the light strip group to which each light strip in the current ambient lamp belongs according to the lighting-effect coordination mode, and determining the refresh time slot of each light strip relative to the sub-frame duration according to the total number of lighting units of the light strip contained in each light strip group.

No matter which lighting-effect coordination mode the target lighting-effect corresponds to, a standardized algorithm can be used to determine the refresh time slot corresponding to each light strip in the current ambient lamp. Specifically, the light strip group can be introduced as a middleware, and the refresh time slot of each light strip in various lighting-effect coordination modes can be determined by operating the light strip group.

To this end, according to whether the lighting-effect coordination mode belongs to the synchronous playback mode or the sequential playback mode, all the light strips in the current ambient lamp can be divided into one or more light strip groups, and each light strip is assigned into a corresponding light strip group. For example, in the synchronous playback mode, each light strip is independently assigned to a corresponding light strip group; in the sequential playback mode, all the light strips are assigned to a single light strip group. In this way, one or more light strip groups can be obtained in different lighting-effect coordination modes. Each light strip group may contain one or all light strips, and the number of lighting units in each light strip is fixed. Therefore, the total number of lighting units in the light strips contained in each light strip group can be directly determined, that is, the sum of the number of lighting units in each light strip in the light strip group, so as to determine the total number of lighting units contained in each light strip group.

When each light strip in all the light strips belongs to a light strip group corresponding to itself, the light strips are in a synchronous playback relationship, and therefore, the light strip groups are also in a synchronous playback relationship. When all the light strips belong to the same light strip group, then the light strips are in a sequential playback relationship. From this perspective, the playback duration corresponding to each light strip group corresponds to the playback duration of the sub-frame lighting-effect. For any light strip group, since only all the lighting units of all the light strips can implement frame slice control to coordinate the sub-frame lighting-effect, the refresh time slot of each light strip in the light strip group corresponding to the sub-frame lighting-effect can be determined according to the total number of lighting units in each light strip group. Therefore, the calculation of the refresh time slots of the light strips is unified in such algorithm, so that the lighting-effect coordination mode, whether it is a synchronous playback mode or a sequential playback mode, can standardize the refresh time slot corresponding to the light strip according to the total number of lighting units of the light strip group to which the light strip belongs.

From another perspective, if each light strip belongs to a different light strip group, then the light strips are in a synchronous playback relationship. When playing the sliced frame lighting-effect, each light strip is played synchronously, and there is no need to adjust the relative time difference between the refresh time slot of each light strip. If all the light strips belong to a single light strip group, then the light strips are played in sequence, and when playing the frame slices, the light strips can make corresponding adjustments to the relative time difference of the refresh time slots in association with the number of their respective lighting units. That is to say, in the case of multiple light strip groups, the light strip groups maintain a synchronous playback relationship, so that the light strips start the playback of the frame slices with the same timing, so that each light strip can play the lighting-effect of the frame slice; while in the case of a single light strip group, the timing of each light strip in the light strip group to start the playback of the frame slice can be adjusted to the relative time difference of each start time according to the proportion of their respective lighting unit numbers, so that each light strip can play in sequence and cooperate to present the lighting-effect of the frame slices (the sub-frame lighting-effects).

According to the above description, when determining the refresh time slot corresponding to each light strip, it can determine the refresh time slot corresponding to each light strip group, and then set this refresh time slot as the refresh time slot corresponding to each light strip in the light strip group. That is, when determining the refresh time slot, it is necessary to consider both the significance of the duration of the interval time period and the significance of the refresh time slot of the corresponding other light strips in the start time difference. Therefore, considering that the light strip uses the lighting units as independent control units, the corresponding refresh time slot can be determined according to the total amount of all lighting units composed of all light strips in each light strip group, based on the sub-frame duration, and the start time of the refresh time slot of each light strip is configured according to whether each light strip belongs to the same light strip group or to a separate light strip group. When each light strip is in a synchronous playback relationship, the start time of the refresh time slot of each light strip can be configured to zero time difference, that is, the same start time is used, and when each light strip is in a sequential playback relationship, each light strip must belong to the same light strip group. Therefore, although the refresh time slot of each light strip remains the same, there is a relative time difference between their start times, which can be adjusted accordingly. Specifically, the relative time difference can be adjusted according to the proportion of the number of lighting units in the light strip to the total number of lighting units in the entire light strip group.

Step S5300, according to the corresponding refresh time slot of each light strip, the frame-slice control data of each frame slice of the light strip corresponding to the sub-frame lighting-effect is sent to the corresponding light strip at intervals, so as to control the light-emitting units of each corresponding light strip to cooperate in completing the playback of the sub-frame lighting-effect.

After determining the corresponding refresh time slot of each light strip in the current ambient lamp, the frame lighting-effect can be sliced for each light strip accordingly, and the corresponding frame-slice control data of the light strip under each refresh time slot can be obtained. Of course, the corresponding frame-slice control data is sent to the light strip at intervals of the refresh time slot, and so on, until all the frame slices formed in the light strip of a frame lighting-effect are played, and the playback of the entire frame lighting-effect by the light-emitting units is completed. Each light strip works according to this principle, and can cooperate to complete the playback of the frame lighting-effect. When the lighting-effect coordination mode is the synchronous playback mode, each light strip can synchronously present the sub-frame lighting-effect with the special effect content; when the lighting-effect coordination mode is the sequential playback mode, each light strip can sequentially complete the playback of each part of the special effect content in the sub-frame lighting-effect, so that all light strips can cooperate to complete the coordinated playback of the sub-frame lighting-effects.

When constructing the frame-slice control data corresponding to each light strip in a refresh time slot, the frame-slice control data can be constructed according to the initial value of the lighting-effect color in the lighting-effect description parameter of the current sub-frame lighting-effect in the target lighting-effect, so that the frame-slice control data can indicate that each lighting unit in the current light strip controls the corresponding lamp bead to emit light according to the corresponding lighting-effect color data.

When the target lighting-effect contains multiple sub-frame lighting-effects, the above process is performed for each sub-frame lighting-effect, and each sub-frame lighting-effect can be played sequentially, thereby comprehensively presenting the entire target lighting-effect.

According to the above embodiments, it can be understood that the present disclosure has many technical advantages. For example, firstly, based on the lighting-effect coordination mode in the target lighting-effect to be played, the present disclosure groups multiple light strips in the ambient lamp to obtain one or more light strip groups, so that each light strip in the ambient lamp has its subordinate light strip group, and then, taking the light strip group as a unit, according to the total number of lighting units constituted by the light strips contained in each light strip group, the refresh time slot of the light strips in the corresponding light strip group is determined. When determining the refresh time slot, the total number of lighting units contained in each light strip group is used as a reference, and the corresponding refresh time slot of the light strip in each light strip group is determined on the basis of the sub-frame duration of the target lighting-effect. The role of the refresh time slot is actually to slice each sub-frame lighting-effect in the target lighting-effect to obtain sub-frame slices. Subsequently, according to the refresh time slot interval of each light strip, the frame-slice control data of the corresponding sub-frame slice is sent to the light strip, so that the target lighting-effect can be presented through the coordinated playback of all light strips, meeting the technical update requirements of the atmosphere lighting in new application scenarios.

Secondly, when determining the refresh time slot corresponding to each light strip, the present disclosure uses the light strip group as an intermediate conversion component to play the role of algorithm standardization. As long as the corresponding lighting-effect coordination mode is specified for various lighting-effects, the corresponding refresh time slot can be determined for each light strip in the ambient lamp by the same algorithm implemented in the present disclosure. From the perspective of a frame lighting-effect, it is actually to implement the corresponding slicing operation of this frame lighting-effect corresponding to different light strips through the light strip group, so that regardless of whether the number of lighting units of different light strips is equal, the refresh time slots can be determined by referring to the same frame slicing time duration. Through each light strip according to its corresponding refresh time slot slicing control, one or more frame lighting-effects can be played in coordination, thereby achieving the target lighting-effect. In this process, it is more efficient to determine the refresh time slot based on the light strip group, and because the refresh time slot is calculated and determined based on the number of lighting units of each light strip, the refresh time slot is more accurate. Naturally, when the slicing control is implemented according to the refresh time slot, the lighting-effect obtained is also in line with expectations and coordinated and unified.

In addition, the technical solution of the present disclosure enables the ambient lamp to coordinate the operation of multiple light strips connected to the controller in parallel through a single controller, providing underlying technical support for the evolution of the product form of the ambient lamp, helping to optimize the product experience and promote the market promotion of the product.

Based on above embodiments of the present disclosure, please refer to FIG. 3, the process of obtaining the target lighting-effects to be played by multiple light strips, and determine the lighting-effect coordination mode and sub-frame duration of the target lighting-effect, may further include the followings.

Step S5110, in response to a lighting-effect setting instruction, determine the target lighting-effect corresponding to the instruction, and obtain the lighting-effect application package corresponding to the target lighting-effect.

In one embodiment, the user is allowed to issue a lighting-effect setting instruction to the controller through a terminal device or through the control button provided by the current ambient lamp. In response to the instruction, the controller receives the lighting-effect application package of the target lighting-effect from the terminal device, or calls the lighting-effect application package specified by the user from the local memory.

Step S5120, parse the lighting-effect application package to obtain the lighting-effect description parameters therein, the lighting-effect description parameters include lighting-effect coordination mode, frame-slice control parameters, lighting-effect motion data, and lighting-effect color initial value.

The controller may perform corresponding analysis on the lighting-effect application package, and obtain the lighting-effect description parameters corresponding to the target lighting-effect from the analysis result, and the lighting-effect description parameters can be provided corresponding to each sub-frame lighting-effect of the target lighting-effect. In one embodiment, the lighting-effect description parameters of each sub-frame lighting-effect include the lighting-effect coordination mode, frame-slice control parameters, lighting-effect motion data, and lighting-effect color initial value.

The lighting-effect coordination mode, as mentioned above, can be pre-set to a synchronous playback mode or a sequential playback mode, which is used to indicate the coordination relationship between each light strip in the current ambient lamp when playing the sub-frame lighting-effect.

The frame-slice control parameter, which is used to control the playback rate of each sub-frame lighting-effect, can be expressed as a proportional value or a degree value. For example, it can be expressed as a specific value in the numerical range of 0 to 100, so that the smaller the value, the slower the playback speed, and the larger the value, the faster the playback speed. The frame-slice control parameters can be calculated with the standard slice duration to determine the sub-frame duration, and the sub-frame duration reflects the speed of playback.

The lighting-effect motion data mainly describes the light-emitting timing sequence of the light-emitting units in the light strip, which can be flexibly reflected as long as the controller of the ambient lamp can be analyzed and converted accordingly. Through the analysis and conversion of the lighting-effect motion data, the light-emitting state of each light-emitting unit in each light strip under each frame slice can be obtained, including light-emitting or non-light-emitting, etc. From an overall perspective, it is equivalent to determining the display layout of each pixel in each frame slice. Through the coordinated presentation of the display layout of multiple frame slices in timing, the light motion effect corresponding to the frame lighting-effect and even the entire target lighting-effect can be created.

The initial setting value of the lighting-effect color mainly provides a basis for setting the lighting-effect color data for each light-emitting unit in the display layout of each frame slice determined according to the lighting-effect motion data, so it can be used when constructing the frame-slice control data.

The lighting-effect motion data and the lighting-effect color initial value are packaged and described in a predetermined format in the lighting-effect description parameters, and can be parsed accordingly in the current atmosphere lighting controller. The present disclosure only needs to be concerned with the ability of the ambient lamp to apply the corresponding lighting-effect description parameters, without excessively focusing on the conversion processing of the lighting-effect motion data and the lighting-effect color initial value. Therefore, this part will not be described in more detail.

Step S5130, determine each sub-frame lighting-effect of the target lighting-effect according to the lighting-effect motion data, and determine the lighting-effect color data corresponding to each sub-frame lighting-effect in combination with the lighting-effect color initial value.

As mentioned above, according to the lighting-effect motion data in the lighting-effect description parameters of the target lighting-effect, the lighting-effect description parameters of each sub-frame lighting-effect can be obtained, and of course, the lighting-effect motion data and lighting-effect color initial value corresponding to each sub-frame lighting-effect can also be distinguished or determined.

As an example, the lighting-effect motion data may specify a color gradient motion mode from left to right. According to this motion mode, each sub-frame lighting-effect constituting the motion change relationship can be determined. Further, in combination with the lighting-effect color setting value, for example, two values corresponding to the gradient from red to green are provided as end values. Thus, according to the motion relationship of the color gradient, the lighting-effect color data corresponding to each sub-frame lighting-effect can be calculated.

Step S5140: Determine the sub-frame duration corresponding to the sub-frame lighting-effect according to the frame-slice control parameter and the slice standard duration preset by the current ambient lamp.

In one embodiment, the current ambient lamp is preset with a standard slice duration, allowing the user to adjust the slice standard duration by providing the corresponding frame-slice control parameter to obtain the corresponding sub-frame duration.

For example, when the frame-slice control parameter is expressed as a proportional value, i.e., a speed ratio, the corresponding sub-frame duration can be obtained by multiplying the slice standard duration by the frame-slice control parameter. For another example, when the frame-slice control parameter is expressed as a degree value, such as a specific value between 0 and 100, the corresponding sub-frame duration can be obtained by dividing the slice standard duration by the frame-slice control parameter.

It can be understood that the standard duration of the slice plays a reference role, allowing the user to adjust the speed of the lighting-effect played by the ambient lamp by providing the corresponding frame-slice control parameters, so that the user can customize the playing speed of the lighting-effect. In other embodiments, the frame-slice control parameters can also be set by the user through an adjustment device connected to the controller, and its role is the same as that of the above embodiments.

According to the above embodiments, it can be known that the ambient lamp can receive a user instruction and apply the target lighting-effect, and various specific parameters are extracted according to the lighting-effect application package of the target lighting-effect, so as to obtain each sub-frame lighting-effect and its lighting-effect description parameters, and the lighting-effect color data of each sub-frame lighting-effect can be determined according to the lighting-effect motion data and the initial value of the lighting-effect color, and the sub-frame duration can be calculated and adjusted based on the user-defined frame-slice control parameters and the standard slice duration that characterizes the speed of lighting-effect playback to obtain a reference for determining the corresponding lighting-effect time slot for each light strip, so that the refresh time slot of each light strip can obtain an accurate result relative to the same reference, thereby controlling each light strip of the ambient lamp to accurately play the target lighting-effect. At the same time, various attributes required for each sub-frame lighting-effect, especially the lighting-effect color data and sub-frame duration, can be determined in batches in a one-stop manner, and the data encapsulation of each sub-frame lighting-effect is completed, which is more efficient.

Based on above embodiments of the present disclosure, please refer to FIG. 4, the process of determining the light strip group to which each light strip in the current ambient lamp belongs according to the lighting-effect coordination mode, and determining the refresh time slot of each light strip relative to the sub-frame duration according to the total number of lighting units of the light strip contained in each light strip group may further includes the followings.

Step S5210, identify the lighting-effect coordination mode in the target lighting-effect, the lighting-effect coordination mode is any one of the following modes: a synchronous playback mode, and a sequential playback mode.

The target lighting-effect provides data corresponding to the lighting-effect coordination mode in its lighting-effect control parameters, so the corresponding lighting-effect coordination mode can be obtained by directly reading or parsing the data. As mentioned above, the lighting-effect coordination mode can be a synchronous playback mode or a sequential playback mode.

Step S5220, when the lighting-effect coordination mode is the synchronous playback mode, each light strip of the current ambient lamp is respectively regarded as an independent light strip group, and the refresh time slot corresponding to the sub-frame duration of each light strip is determined according to the total number of lighting units of the light strip of each light strip group.

When the lighting-effect coordination mode is the synchronous playback mode, it means that each light strip in the current ambient lamp plays the same sub-frame lighting-effect and presents the same lighting-effect. A corresponding light strip group can be set for each light strip in the ambient lamp, and each light strip group includes a single light strip, and each light strip only belongs to a single light strip group, that is, there is a one-to-one correspondence between the light strip group and the light strip. Accordingly, as described previously, the refresh time slot corresponding to each light strip group can be determined according to the total number of lighting units of the light strip of each light strip group, and the refresh time slot is also the refresh time slot corresponding to the lighting units in the light strip group.

In the synchronous playback mode, the refresh time slots of each light strip are started synchronously, so the relative time difference between the refresh time slots of each light strip is zero time difference. The refresh time slots of each light strip are configured to start simultaneously, so that the start time of each light strip is the same, and there is no start time difference between each other. Subsequently, it can be ensured that each light strip starts to start the playback of the sub-frame lighting-effect at the same time.

Step S5230, when the lighting-effect coordination mode is the sequential playback mode, the various light strips of the current ambient lamp are orderly combined as a single light strip group, and the refresh time slots of all the light strips as a whole corresponding to the sub-frame duration are determined according to the total number of lighting units of all the light strips in the light strip group.

When the lighting-effect coordination mode is the sequential playback mode, it means that each sub-frame lighting-effect will play the corresponding part of the special effect content through each light strip in the current ambient lamp successively, and the playback of the sub-frame lighting-effect is realized through the cooperation of these light strips. Therefore, all the light strips in the ambient lamp can be added to a single light strip group according to a default order, and all the light strips are regarded as a same light strip and belong to different parts of the same light strip. Therefore, according to the methods shown in the above embodiments, the refresh time slots corresponding to the single light strip group can be determined according to the total number of lighting units obtained by adding the number of lighting units of all light strips in the single light strip group, and the refresh time slot is also the refresh time slot corresponding to each lighting unit in the light strip group.

In the sequential play mode, the refresh time slots of each light strip are started sequentially, so the relative time difference between the refresh time slots of each light strip needs to be set. Specifically, the apportioned duration of each light strip to the sub-frame duration can be determined by the ratio of the number of lighting units of each light strip to the total number of lighting units of the entire light strip group, and then the relative time difference between the refresh time slots of each light strip is determined according to the difference between the apportioned durations. The start time of the refresh time slot of the corresponding lighting unit is configured according to the relative time difference. Accordingly, for the same frame slice, each lighting unit plays a part of the special effect content in the sub-frame lighting-effect sequentially, and the sub-frame lighting-effect is played in coordination.

According to the above embodiments, it can be known that by distinguishing two different lighting-effect coordination modes, namely synchronous playback mode and sequential playback mode, and in different modes, the corresponding specific algorithm is applied to determine the refresh time slot of each light strip, and the relative time difference of each refresh time slot is adjusted as needed, thereby realizing the work distribution of the sub-frame lighting-effects in the target lighting-effect in multiple different light strips, so that the frame slicing of each light strip is unified into the same algorithm, and the refresh time slot of each light strip is effectively and accurately set, so that the number of frame slices corresponds to the number of lighting units of the light strip, which is more efficient and more universal.

Based on above embodiments of the present disclosure, please refer to FIG. 5, the process of according to the total number of lighting units of the light strip of each light strip group, determining the refresh time slot of each light strip corresponding to the sub-frame duration may further include the followings.

Step S5221, obtaining the number of lighting units of all light strips in the current ambient lamp as the total number of lighting units of the independent light strip group to which the corresponding light strip belongs.

The number of lighting units of each light strip is pre-stored in the memory of the current ambient lamp, which can be called or obtained when needed. In one embodiment, considering the application in the synchronous playback mode, each light strip independently constitutes a light strip group. When each light strip constitutes a single light strip group, the number of lighting units of each light strip is read as the total number of lighting units of the corresponding light strip group.

Step S5222: Taking the total number of lighting units of one of the light strip groups as a reference, determine the number ratio of the total number of lighting units of each light strip group corresponding to the reference.

Based on the total number of lighting units of each light strip group, the number ratio between the total number of lighting units of each light strip group can be further determined to quantify the relative relationship between the lighting units of light strip groups, that is, the light strips.

In one embodiment, the number of lighting units of the light strip that is set as the main light strip by default in the current ambient lamp can be determined, that is, the total number of lighting units of the light strip group to which that light strip belongs, and it can be set as the reference. Then, the ratio between the total number of lighting units of all the light strip groups and the reference is obtained, that is, the number ratio corresponding to each light strip group, that is, the light strips therein, is obtained. In some embodiments, for the convenience of calculation, the maximum value of the total number of lighting units can be selected as the reference.

For example, when the total number of light-emitting units of the main light strip is 'n1', and the total number of light-emitting units of the remaining light strips are 'n2', 'n3', etc., the corresponding number ratios of all the corresponding light strips are: n1/n1, n2/n1, n3/n1, etc.

Step S5223, determine the product of the number ratio of each light strip group and the sub-frame duration as the refresh time slot of the light strip in the corresponding light strip group, and configure the start time difference between the refresh time slots of the lighting units to be zero time difference.

After determining the number ratio of each light strip group, it is only necessary to multiply the number ratio corresponding to each light strip group by the determined sub-frame duration to obtain the refresh time slot of the corresponding light strip group, that is, the refresh time slot corresponding to the light strip in the light strip group. Since the refresh time slot is calculated in the synchronous playback mode, there is no time difference in the start time of the refresh time slot of each light strip, so the start time difference between them is zero time difference, that is, there is no need to adjust the start time difference of the refresh time slot of each light strip.

It can be seen from the above embodiments that, in the synchronous playback mode, by obtaining the number ratio of the total amount of light-emitting units of each light strip group and the total amount of light-emitting units of a light strip group serving as a reference, the relative duration relationship between the frame slices of each light strip group can be quantified, and the refresh time slot of each light strip group can be determined according to the product of the number ratio of each light strip group and the sub-frame duration. Since there is no startup time difference between the light strips in the synchronous playback mode, there is no need to adjust the startup time of the refresh time slot, thereby quickly determining the refresh time slot of each light strip. The refresh time slot of each light strip in the synchronous playback mode is determined based on the number ratio, which is fast, efficient and accurate.

On the basis of the above embodiments of the present disclosure, the process of according to the total number of light-emitting units of the light strips of each light strip group, determining the refresh time slot of each light strip corresponding to the sub-frame duration is determined may include the followings.

Step S5231, obtaining the number of light-emitting units of all light strips in the current ambient lamp, and summing up the total number of light-emitting units of the single light strip group to which all the light strips belong.

As mentioned above, the number of light-emitting units of each light strip is pre-stored in the memory of the current ambient lamp, which can be called when needed. In one embodiment, considering the application in the sequential playback mode, all the light strips in the current ambient lamp are merged into the same light strip group, and the order of each light strip is set according to the preset order relationship. When all the light strips belong to a single unified light strip group, the number of light-emitting units of each light strip is read and summed up to obtain the total number of light-emitting units of the unified light strip group.

Step S5232, set the sub-frame duration to the refresh time slot uniformly corresponding to each light strip in the single light strip group, and configure the start time difference of the light strip relative to other light strips according to the order of each light strip in the light strip group and the proportion of the number of lighting units to the total amount of lighting units.

In the sequential playback mode, each light strip in the unified light strip group cooperates to complete the playback of each frame slice of the frame lighting-effect in succession, and each frame slice can be filled with the frame-slice control data of each light strip, but the frame-slice control data needs to be split into the corresponding parts of each light strip. In this case, the refresh time slot of each light strip is the same, but there is a relative time difference in the start time of each refresh time slot, that is, when the light strip that is ranked first completes the playback control of its corresponding frame-slice control data, the other light strip that is ranked successively next is controlled to complete the playback control of its corresponding frame-slice control data.

Based on this, the predetermined sub-frame duration can be directly determined as the refresh time slot of the unified light strip group, and this refresh time slot is also the refresh time slot of each light strip in the unified light strip group. For the refresh time slot of each light strip, it is necessary to adjust the relative time difference in the start time. Specifically, the start order of the refresh time slot of each light strip can be determined according to the order of each light strip in the unified light strip group, and the specific start time can be obtained by multiplying the proportion of the number of lighting units of each lighting unit to the total number of lighting units of the entire unified light strip group by the sub-frame duration to obtain the apportioned time length of each light strip to the sub-frame duration, and then according to the difference between the apportioned time lengths of two adjacent light strips, the relative time difference can be determined.

For example, when there are three light strips arranged in a light strip group, and the number of lighting units in each light strip group is 10, 40, and 50 respectively, the total number of lighting units in the entire light strip group is 100. Assuming the sub-frame duration is t, the apportioned durations of the three light strips are 0.1 t, 0.4 t, and 0.5 t respectively. The relative time difference between each two adjacent light strips is 0.3 t and 0.1 t. The start time of the lighting unit ranked first is taken as the reference value 0. Based on this, the start time sequence of the refresh time slots of the three light strips can be determined to be 0, 0.3 t, and 0.4 t respectively.

According to the above embodiments, in the sequential playback mode, the sub-frame duration is directly set as the refresh time slot, and then the apportioned duration of each light strip corresponding to the sub-frame duration is determined by the ratio of the number of lighting units of each light strip to the total number of lighting units of the entire light strip group, and then the start time of the refresh time slot of each light strip is determined according to the difference between the apportioned durations of each light strip, and the setting of the refresh time slot is completed, thereby quickly and accurately determining the refresh time slot of each light strip, which is fast and efficient.

Figure 6:
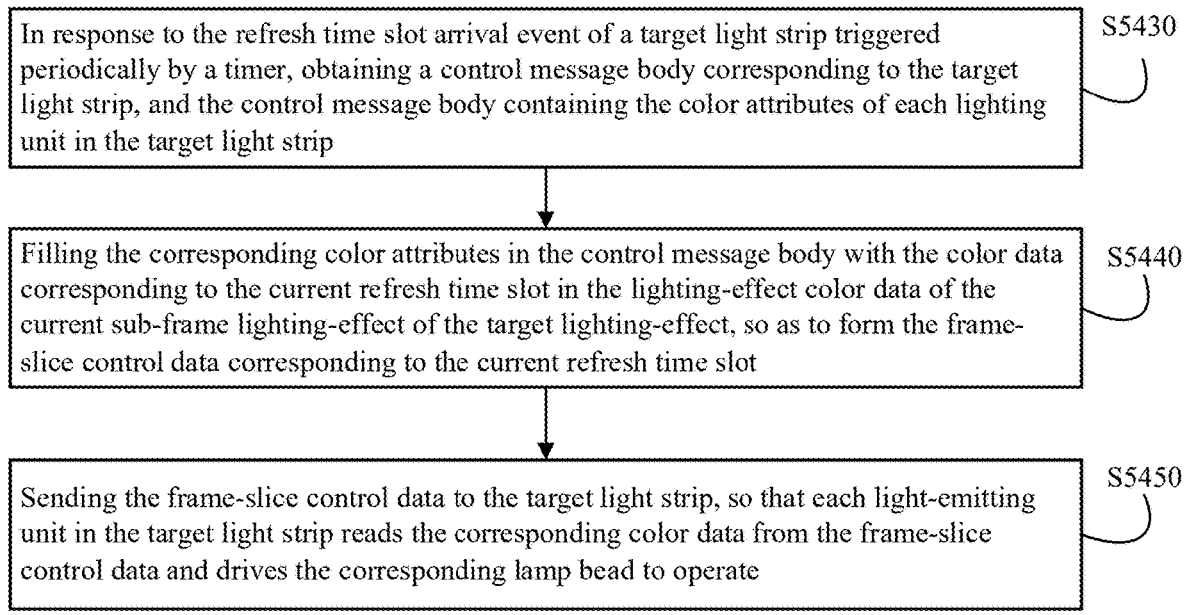
FIG. 6 illustrates a flow chart of constructing the frame-slice control data of the light strip based on the event response mechanism according to an embodiment of the present disclosure.

Based on the above embodiments of the present disclosure, please refer to FIG. 6, according to the corresponding refresh time slot of each light strip, the frame-slice control data of each frame slice of the light strip corresponding to the sub-frame lighting-effect is sent to the corresponding light strip at intervals to control the lighting units of each corresponding light strip to cooperate in completing the playback of the sub-frame lighting-effect. This process may include the followings.

Step S5430, in response to the refresh time slot arrival event of any target light strip triggered periodically by a timer, obtain a control message body corresponding to the target light strip, and the control message body contains the color attributes of each lighting unit in the target light strip.

For the playback of each sub-frame lighting-effect in the target lighting-effect, it is necessary to coordinate and control the operation of each light strip in the ambient lamp to achieve the playback. To this end, the controller of the current ambient lamp can generate the control data corresponding to each light strip according to the lighting-effect description parameters of the sub-frame lighting-effect. Specifically, when each refresh time slot of each light strip arrives, in response to the arrival event of the refresh time slot, the frame-slice control data corresponding to the light strip in the refresh time slot is constructed, and then the frame-slice control data is sent to the light strip to control the operation of each lighting unit therein. It is not difficult to understand that each frame-slice control data can control the corresponding light strip to collaboratively complete the lighting-effect playback task corresponding to a frame slice.

The refresh time slot arrival event of each light strip can be triggered by a system preset timer, and the corresponding timer is configured with the refresh time slot determined in advance for each light strip, so that the timer counts according to the start time and specific duration of the refresh time slot, and triggers a corresponding arrival event after each cycle. Each light strip can work based on the above event response mechanism. Since the refresh time slot of each light strip has been pre-configured according to the corresponding lighting-effect coordination mode, it can effectively control each light strip to work collaboratively according to the corresponding lighting-effect coordination mode to play the corresponding sub-frame lighting-effect.

In order to construct the frame-slice control data corresponding to each refresh time slot of the light strip, a control message body can be defined for each light strip in advance. When it is necessary to construct the frame-slice control data corresponding to the refresh time slot arrival event of the target light strip, the control message body can be obtained for use. The control message body is structured, and it provides corresponding color attributes for each lighting unit in the light strip. By assigning values to these color attributes, the control message body can be improved to obtain the corresponding frame-slice control data.

Step S5440, fill the corresponding color attributes in the control message body with the color data corresponding to the current refresh time slot in the lighting-effect color data of the current sub-frame lighting-effect of the target lighting-effect, so as to form the frame-slice control data corresponding to the current refresh time slot.

When it is necessary to construct the frame-slice control data of the frame slice corresponding to the refresh time slot arrival event of the target light strip, the color data corresponding to the current refresh time slot, that is, the current frame slice, can be directly read from the lighting-effect color data of the current sub-frame lighting-effect, and these color data are filled into the color attributes of the control message body of the target light strip according to the corresponding relationship of the light-emitting units, and the assignment of values in the control message body is completed so as to obtain the corresponding frame-slice control data.

Step S5450, send the frame-slice control data to the target light strip, so that each light-emitting unit in the target light strip reads the corresponding color data from the frame-slice control data and drives the corresponding lamp bead to operate.

After obtaining the frame-slice control data of the target light strip, the controller directly sends the frame-slice control data to the target light strip. Since each lighting unit in the light strip works based on a serial protocol, and the frame-slice control data also provides the color data of each lighting unit in sequence based on the serial protocol, each lighting unit in the target light strip intercepts its own color data after receiving the frame-slice control data, and continues to send the remaining frame-slice control data to the subsequent lighting unit, and converts its own color data into the corresponding light control signal through the control chip to drive its own lamp bead to operate. Therefore, each lighting unit in the target light strip can work in coordination according to the definition of the lighting-effect description parameters of the sub-frame lighting-effect to play the corresponding sub-frame lighting-effect. By each light strip following the above principle, driven by its own refresh time slot arrival event and applying the corresponding color data to control the lighting units to operate, the sub-frame lighting-effect can be played in coordination. By playing the sub-frame lighting-effects of the target lighting-effect one after another through these light strips according to the above principle, the entire target lighting-effect can be played.

According to the above embodiments, after completing the configuration of the refresh time slots of each light strip, the present disclosure only needs to implement the steps of responding to the refresh time slot arrival event of each light strip based on a standardized interface method, so as to construct frame-slice control data corresponding to each frame slice for each light strip in a standardized manner, thereby controlling each light strip to organically cooperate to play the corresponding lighting-effect. The code is concise, the execution efficiency is high, and the system resources are less occupied. It is particularly suitable for deployment in embedded chips, and is therefore more suitable for implementation in products such as ambient lamps that use embedded chips as controllers.

Based on the above embodiments of the present disclosure, before responding to the refresh time slot arrival event of a target light strip triggered at intervals by the timer, the following may also be included.

Step S5410, setting the timer corresponding to each light strip, and configuring the refresh time slot of each light strip as the timing cycle of the timer of the light strip;

As mentioned above, the timer corresponding to each light strip can be responsible for driving each light strip to play each frame slice of the frame lighting-effect. For this purpose, the corresponding timer can be set for each light strip in advance, and the timer of each light strip can be configured to periodically trigger the corresponding refresh time slot arrival event according to the refresh time slot of the light strip, that is, to start timing at the corresponding start time, and the timing cycle is set according to its corresponding refresh time slot. The timer triggers the corresponding arrival event every time it completes the timing of a refresh time slot.

Step S5420, start the timer to time each lighting unit according to its corresponding refresh time slot to trigger the corresponding refresh time slot arrival event.

When each timer completes the configuration of the corresponding refresh time slot, each timer can be started to operate, and the start time of each timer is limited by the start time of the base refresh time slot. When the lighting-effect coordination mode is the synchronous play mode, there is no relative time difference between the refresh time slots of each light strip, and the timers of each light strip start timing synchronously or at the same time. When it is the sequential play mode, as described above, the relative time difference of the refresh time slots between each light strip has been determined according to the order of each light strip in the light strip group to which it belongs and the ratio of the number of lighting units of the light strip to the total number of lighting units of the entire light strip group. Therefore, the start time of the corresponding timer, that is, the start time of the corresponding refresh time slot can be determined according to the relative time difference, so as to realize the start of each timer, so that it can generate a corresponding arrival event based on the corresponding refresh time slot, and then execute the process of steps S5430 to S5450 based on the arrival event.

According to the above embodiments, by setting a corresponding timer for each light strip, the playback control of the sub-frame lighting-effect in multiple light strips is decomposed into concurrent multi-tasks. Through the efficiency advantage of multi-task concurrent operation, it is ensured that each light strip can work stably in parallel, making the playback process of the target lighting-effect in the ambient lamp more stable and reliable.

Figure 7:
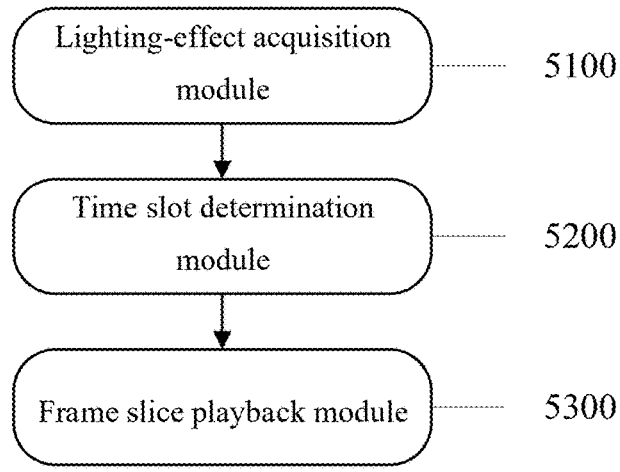
FIG. 7 illustrates a schematic structural diagram of a lighting-effect coordinated playback device according to an embodiment of the present disclosure.

FIG. 7 illustrates a lighting-effect coordinated playback device according to an embodiment of the present disclosure. As shown in FIG. 7, the playback device includes a lighting-effect acquisition module 5100, a time slot determination module 5200, and a frame slice playback module 5300, etc.

The lighting-effect acquisition module 5100 is configured to acquire target lighting-effects to be played by multiple light strips, determine the lighting-effect coordination mode and sub-frame duration of the target lighting-effect, and the target lighting-effect describes at least one sub-frame lighting-effect. The time slot determination module 5200 is configured to determine the light strip group to which each light strip in the current ambient lamp belongs according to the lighting-effect coordination mode, and determine the refresh time slot of each light strip relative to the sub-frame duration according to the total number of lighting units of the light strip contained in each light strip group. The frame slice playback module 5300 is configured to send frame-slice control data of each frame slice of the light strip corresponding to the sub-frame lighting-effect to the corresponding light strip according to the corresponding refresh time slot of each light strip, so as to control the lighting units of each corresponding light strip to coordinately complete the playback of the sub-frame lighting-effect. Based on embodiments of the present disclosure, the lighting-effect acquisition module 5100 may further include: a setting response unit, which is configured to respond to the lighting-effect setting instruction, determine the target lighting-effect corresponding to the instruction, and obtain the lighting-effect application package corresponding to the target lighting-effect; a parsing and extraction unit, which is configured to parse the lighting-effect application package to obtain the lighting-effect description parameters therein, wherein the lighting-effect description parameters include the lighting-effect coordination mode, the frame-slice control parameters, the lighting-effect motion data, and the lighting-effect color initial setting value; a sub-frame processing unit, which is configured to determine each sub-frame lighting-effect of the target lighting-effect according to the lighting-effect motion data, and determine the lighting-effect color data corresponding to each sub-frame lighting-effect in combination with the lighting-effect color initial setting value; a duration determination unit, which is configured to determine the sub-frame duration corresponding to the sub-frame lighting-effect according to the frame-slice control parameters and the preset sub-frame standard duration of the current ambient lamp. Based on embodiments of the present disclosure, the time slot determination module 5200 includes: a mode recognition unit, configured to identify the lighting-effect coordination mode in the target lighting-effect, wherein the lighting-effect coordination mode is any one of the following modes: synchronous playback mode and sequential playback mode; a synchronization processing unit, configured to treat each light strip of the current ambient lamp as an independent light strip group when the lighting-effect coordination mode is the synchronous playback mode, and determine the refresh time slot of each light strip corresponding to the sub-frame duration according to the total amount of lighting units of the light strip of each light strip group; an asynchronous processing unit, configured to combine each light strip of the current ambient lamp in an orderly manner as a single light strip group when the lighting-effect coordination mode is the sequential playback mode, and determine the refresh time slot of all the light strips as a whole corresponding to the sub-frame duration according to the total amount of lighting units of all the light strips in the light strip group.

Based on embodiments of the present disclosure, the synchronization processing unit includes: an independent grouping subunit, configured to obtain the number of light-emitting units of all light strips in the current ambient lamp as the total number of light-emitting units of the independent light strip group to which the corresponding light strip belongs; a quantization processing subunit, configured to use the total number of light-emitting units of one light strip group as a reference to determine the number ratio of the total number of light-emitting units of each light strip group corresponding to the reference; a time slot calculation subunit, configured to determine the product of the number ratio of each light strip group and the sub-frame duration as the refresh time slot of the light strip in the corresponding light strip group, and configure the start time difference between the refresh time slots of each lighting unit to be zero time difference.

Based on embodiments of the present disclosure, the asynchronous processing module includes: an overall grouping subunit, configured to obtain the number of light-emitting units of all light strips in the current ambient lamp, and sum up the total number of light-emitting units of the single light strip group to which all the light strips belong; a time slot setting subunit, configured to set the sub-frame duration to the refresh time slot uniformly corresponding to each light strip in the single light strip group, and configure the start time difference of the light strip relative to other light strips according to the order of each light strip in its light strip group and the proportion of the number of light-emitting units to the total number of light-emitting units.

Based on embodiments of the present disclosure, the frame slice playback module 5300 includes: a timing response unit, configured to respond to the refresh time slot arrival event of any target light strip triggered by the timer at intervals, and obtain the control message body corresponding to the target light strip, wherein the control message body includes the color attributes of each lighting unit in the target light strip; a slice configuration unit, configured to fill each corresponding color attribute in the control message body with the color data corresponding to the current refresh time slot in the lighting-effect color data of the current sub-frame lighting-effect of the target lighting-effect, so as to form the frame-slice control data corresponding to the current refresh time slot; a slice application unit, configured to send the frame-slice control data to the target light strip, so that each lighting unit in the target light strip reads the corresponding color data from the frame-slice control data and drives the corresponding lamp beads to operate.

Based on embodiments of the present disclosure, the frame slice playback module 5300 includes: a timing configuration unit, which is configured to set the timer corresponding to each light strip, and configure the refresh time slot of each light strip as the timing period of the timer of the light strip; a timing start unit, which is configured to start the timer to time each lighting unit according to its corresponding refresh time slot to trigger the corresponding refresh time slot arrival event; where, when the lighting-effect coordination mode is the synchronous playback mode, the timers of each light strip are started synchronously, and when it is the sequential playback mode, the relative time difference of the refresh time slots between each light strip is determined according to the order of each light strip in the light strip group to which it belongs and the ratio of the number of lighting units of the light strip to the total number of lighting units of the entire light strip group, and each timer is started accordingly according to the relative time difference.

Figure 8:
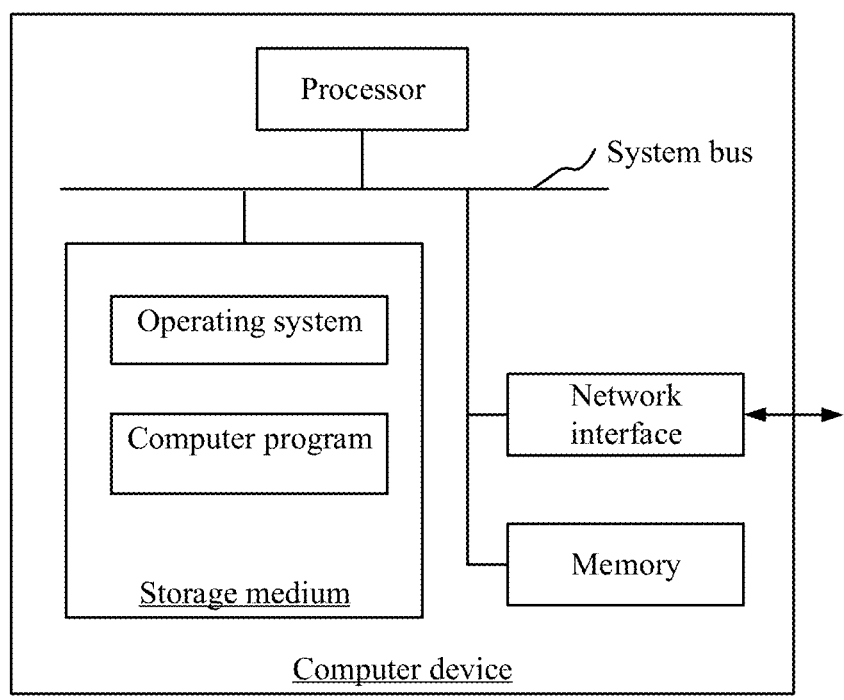
FIG. 8 illustrates a schematic structural diagram of a computer device according to an embodiment of the present disclosure.

FIG. 8 illustrates a computer device in a lighting-effect coordinated playback device according to an embodiment of the present disclosure. The lighting-effect coordinated playback device may be an ambient lamp. The controller carried in the ambient lamp may be implemented based on a computer device. As shown in FIG. 8, the computer device includes a processor, a computer-readable storage medium, a memory, and a network interface, etc., all of which may be connected via a system bus. Among them, the computer-readable storage medium of the computer device stores an operating system, a database, and computer-readable instructions or computer program. The database may store a control information sequence. When the computer-readable instructions are executed by the processor, the processor may implement a lighting-effect coordinated playback method. The processor of the computer device is used to provide computing and control capabilities to support the operation of the entire computer device. The memory of the computer device may store computer-readable instructions. When the computer-readable instructions are executed by the processor, the processor may execute the lighting-effect coordinated playback method of the present disclosure. The network interface of the computer device is used to connect and communicate with a terminal. Those skilled in the art can understand that the structure shown in FIG. 8 is only a block diagram of a part of the structure related to the solution of the present disclosure, and does not constitute a limitation on the computer device to which the solution of the present disclosure is applied. The specific computer device may include more or fewer components than those shown in the figure, or combine certain components, or have different component arrangements.

In one embodiment, the processor is used to execute the specific functions of each module and its submodules/units in FIG. 7, and the memory stores the program code and various data required to execute the above modules or submodules. The network interface is used to transmit data between user terminals or servers. The memory in one embodiment stores the program code and data required to execute all modules/submodules in the lighting-effect coordinated playback device of the present disclosure, and the server can call the program code and data of the server to execute the functions of all submodules.

The present disclosure also provides a storage medium storing computer-readable instructions, and when the computer-readable instructions are executed by one or more processors, one or more processors execute the steps of the lighting-effect coordinated playback method described in embodiments of the present disclosure.

The present disclosure also provides a computer program product, including a computer program/instruction, which implements the steps of the lighting-effect coordinated playback method described in embodiments of the present disclosure when the computer program/instruction is executed by one or more processors.

A person skilled in the art can understand that all or part of the processes in the above-mentioned embodiments of the present disclosure can be completed by instructing the relevant hardware through a computer program. The computer program can be stored in a computer-readable storage medium. When the program is executed, it can include the processes of the embodiments of the above-mentioned methods. Among them, the aforementioned storage medium can be a computer-readable storage medium such as a disk, an optical disk, a read-only memory (ROM), or a random access memory (RAM).

The above is only a part of the embodiments of the present disclosure. It should be pointed out that for a person skilled in the art, several improvements and modifications can be made without departing from the principle of the present disclosure, and these improvements and modifications should also be regarded as within the scope of the present disclosure.

Accordingly, the present disclosure standardizes the coordinated playback control process of lighting-effects in multiple light strips, and implements frame-slice control for each light strip by determining the corresponding refresh time slot of each light strip, playing sub-frame lighting-effects, and obtaining frame-slice control data for each light strip. According to the corresponding refresh time slot of each light strip, the corresponding frame-slice control data is sent to control all light strips to coordinately play the same target lighting-effect, thereby achieving efficient and precise application of the target lighting-effect in ambient lamps with multiple light strips, which is conducive to the industrial promotion of ambient lamps with multiple light strips.

What is claimed is:

1. A lighting-effect coordinated playback method, comprising:

obtaining a target lighting-effect to be played by multiple light strips, and determining a lighting-effect coordination mode and a sub-frame duration of the target lighting-effect, wherein the target lighting-effect includes at least one sub-frame lighting-effect, and the sub-frame duration is used to define a theoretical playback duration of a frame slice of a sub-frame lighting-effect, so as to serve as a reference for determining a refresh time slot of each light strip;

determining each light strip group to which each light strip in the current ambient lamp belongs according to the lighting-effect coordination mode, and determining the refresh time slot of each light strip relative to the sub-frame duration according to a total number of lighting units of the light strip contained in each light strip group; and according to the corresponding refresh time slot of each light strip, sending frame-slice control data of each frame slice of the light strip corresponding to the sub-frame lighting-effect to the corresponding light strip at intervals, so as to control light units of each corresponding light strip to coordinately complete playback of the sub-frame lighting-effect, wherein the determining each light strip group to which each light strip in the current ambient lamp belongs according to the lighting-effect coordination mode, and determining the refresh time slot of each light strip relative to the sub-frame duration according to a total number of lighting units of the light strip contained in each light strip group further includes:

identifying the lighting-effect coordination mode in the target lighting-effect, the lighting-effect coordination mode being one of a synchronous playback mode and a sequential playback mode, when the lighting-effect coordination mode is the synchronous playback mode, respectively regarding the light strips of the current ambient lamp as independent light strip groups, and determining the refresh time slots of each light strip corresponding to the sub-frame duration according to the total number of light units of the light strips of each light strip group;

when the lighting-effect coordination mode is the sequential playback mode, orderly combining the light strips of the current ambient lamp as a single light strip group, and determining the refresh time slots of all the light strips as a whole corresponding to the sub-frame duration according to the total number of light units of all the light strips in the light strip group.

2. The lighting-effect coordinated playback method according to claim 1, wherein the obtaining a target lighting-effect to be played by multiple light strips, and determining a lighting-effect coordination mode and sub-frame duration of the target lighting-effect further includes:

in response to a lighting-effect setting instruction, determining the target lighting-effect corresponding to the lighting-effect setting instruction, and obtaining a lighting-effect application package corresponding to the target lighting-effect;

parsing the lighting-effect application package to obtain lighting-effect description parameters therein, the lighting-effect description parameters including the lighting-effect coordination mode, frame-slice control parameters, lighting-effect motion data, and lighting-effect color initial setting value;

determining each sub-frame lighting-effect of the target lighting-effect according to the lighting-effect motion data, and determining the lighting-effect color data corresponding to each sub-frame lighting-effect in combination with the lighting-effect color initial setting value; and determining the frame slice duration corresponding to the sub-frame lighting-effect according to the frame-slice control parameters and a preset standard sub-frame duration of the current lamp.

3. The lighting-effect coordinated playback method according to claim 1, wherein the determining the refresh time slots of each light strip corresponding to the sub-frame duration according to the total number of light units of the light strips of each light strip group further includes:

getting the number of light units of all light strips in the current lamp as the total number of light units of the independent light strip group to which the corresponding light strip belongs;

taking the total number of light units of one of the light strip groups as a reference, determining a number ratio of the total number of light units of each light strip group relative to the reference; and determining a product of the number ratio of each light strip group and the sub-frame duration as the refresh time slot of the light strip in the corresponding light strip group, and configuring start time difference between the refresh time slots of the light units to be zero time difference.

4. The lighting-effect coordinated playback method according to claim 1, wherein the determining the refresh time slots of all the light strips as a whole corresponding to the sub-frame duration according to the total number of light units of all the light strips in the light strip group further includes:

getting the number of light units of all light strips in the current lamp, and summing up the total number of light units of the single light strip group to which all light strips belong;

setting the sub-frame duration as the refresh time slot uniformly corresponding to each light strip in the single light strip group, configuring the start time difference of the light strip relative to other light strips according to an order of each light strip in its light strip group and a proportion of the number of light units to the total number of light units.

5. The lighting-effect coordinated playback method according to claim 1, wherein according to the corresponding refresh time slot of each light strip, sending frame-slice control data of each frame slice of the light strip corresponding to the frame lighting-effect to the corresponding light strip at intervals, so as to control the light units of each corresponding light strip to coordinately complete playback of the sub-frame lighting-effect further includes:

responding to a refresh time slot arrival event triggered periodically by a timer of a target light strip, and obtaining a control message body corresponding to the target light strip, the control message body containing color attributes of each light unit in the target light strip;

using color data corresponding to a current refresh time slot in the lighting-effect color data of the current sub-frame lighting-effect of the target lighting-effect to fill each corresponding color attribute in the control message body to form the frame-slice control data corresponding to the current refresh time slot; and sending the frame-slice control data to the target light strip, so that each light unit in the target light strip reads the corresponding color data from the frame-slice control data and drives the corresponding lamp beads to operate.

6. The lighting-effect coordinated playback method according to claim 5, wherein before responding to a refresh time slot arrival event triggered periodically by a timer of a target light strip, the method further comprising:

setting the timer corresponding to each light strip, configuring the refresh time slot of each light strip as a timing cycle of the timer of the light strip;

starting the timer to time for each light unit according to the corresponding refresh time slot to trigger the corresponding refresh time slot arrival event;

wherein, when the lighting-effect coordination mode is the synchronous playback mode, the timers of the light strips are synchronously started to time, and when the lighting-effect coordination mode is the sequential playback mode, according to the order of each light strip in the light strip group to which the light strip belongs and the number ratio of the number of light units of the light strip to the total number of light units of the entire light strip group, the relative time difference of the refresh time slots between the light strips is determined, and each timer is started according to the relative time difference.

7. A lamp controller, comprising:

at least one processor, and a memory, wherein the processor is used to call and execute a computer program stored in the memory to perform steps of a lighting-effect coordinated playback method, and the method includes:

obtaining a target lighting-effect to be played by multiple light strips, and determining a lighting-effect coordination mode and a sub-frame duration of the target lighting-effect, wherein the target lighting-effect includes at least one sub-frame lighting-effect, and the sub-frame duration is used to define a theoretical playback duration of a frame slice of a sub-frame lighting-effect, so as to serve as a reference for determining a refresh time slot of each light strip;

determining each light strip group to which each light strip in the current ambient lamp belongs according to the lighting-effect coordination mode, and determining the refresh time slot of each light strip relative to the sub-frame duration according to a total number of lighting units of the light strip contained in each light strip group; and according to the corresponding refresh time slot of each light strip, sending frame-slice control data of each frame slice of the light strip corresponding to the sub-frame lighting-effect to the corresponding light strip at intervals, so as to control light units of each corresponding light strip to coordinately complete playback of the sub-frame lighting-effect, wherein the determining each light strip group to which each light strip in the current ambient lamp belongs according to the lighting-effect coordination mode, and determining the refresh time slot of each light strip relative to the sub-frame duration according to a total number of lighting units of the light strip contained in each light strip group further includes:

identifying the lighting-effect coordination mode in the target lighting-effect, the lighting-effect coordination mode being one of a synchronous playback mode and a sequential playback mode, when the lighting-effect coordination mode is the synchronous playback mode, respectively regarding the light strips of the current ambient lamp as independent light strip groups, and determining the refresh time slots of each light strip corresponding to the sub-frame duration according to the total number of light units of the light strips of each light strip group;

when the lighting-effect coordination mode is the sequential playback mode, orderly combining the light strips of the current ambient lamp as a single light strip group, and determining the refresh time slots of all the light strips as a whole corresponding to the sub-frame duration according to the total number of light units of all the light strips in the light strip group.

8. The lamp controller according to claim 7, wherein the obtaining a target lighting-effect to be played by multiple light strips, and determining a lighting-effect coordination mode and sub-frame duration of the target lighting-effect further includes:

in response to a lighting-effect setting instruction, determining the target lighting-effect corresponding to the lighting-effect setting instruction, and obtaining a lighting-effect application package corresponding to the target lighting-effect;

parsing the lighting-effect application package to obtain lighting-effect description parameters therein, the lighting-effect description parameters including the lighting-effect coordination mode, frame-slice control parameters, lighting-effect motion data, and lighting-effect color initial setting value;

determining each sub-frame lighting-effect of the target lighting-effect according to the lighting-effect motion data, and determining the lighting-effect color data corresponding to each sub-frame lighting-effect in combination with the lighting-effect color initial setting value; and determining the frame slice duration corresponding to the sub-frame lighting-effect according to the frame-slice control parameters and a preset standard sub-frame duration of the current lamp.

9. The lamp controller according to claim 7 wherein the determining the refresh time slots of each light strip corresponding to the sub-frame duration according to the total number of light units of the light strips of each light strip group further includes:

getting the number of light units of all light strips in the current lamp as the total number of light units of the independent light strip group to which the corresponding light strip belongs;

taking the total number of light units of one of the light strip groups as a reference, determining a number ratio of the total number of light units of each light strip group relative to the reference; and determining a product of the number ratio of each light strip group and the sub-frame duration as the refresh time slot of the light strip in the corresponding light strip group, and configuring start time difference between the refresh time slots of the light units to be zero time difference.

10. The lamp controller according to claim 7, wherein the determining the refresh time slots of all the light strips as a whole corresponding to the sub-frame duration according to the total number of light units of all the light strips in the light strip group further includes:
  getting the number of light units of all light strips in the current lamp, and summing up the total number of light units of the single light strip group to which all light strips belong;
  setting the sub-frame duration as the refresh time slot uniformly corresponding to each light strip in the single light strip group, configuring the start time difference of the light strip relative to other light strips according to an order of each light strip in its light strip group and a proportion of the number of light units to the total number of light units.

11. The lamp controller according to claim 7, wherein according to the corresponding refresh time slot of each light strip, sending frame-slice control data of each frame slice of the light strip corresponding to the frame lighting-effect to the corresponding light strip at intervals, so as to control the light units of each corresponding light strip to coordinately complete playback of the sub-frame lighting-effect further includes:
  responding to a refresh time slot arrival event triggered periodically by a timer of a target light strip, and obtaining a control message body corresponding to the target light strip, the control message body containing color attributes of each light unit in the target light strip;
  using color data corresponding to a current refresh time slot in the lighting-effect color data of the current sub-frame lighting-effect of the target lighting-effect to fill each corresponding color attribute in the control message body to form the frame-slice control data corresponding to the current refresh time slot; and
  sending the frame-slice control data to the target light strip, so that each light unit in the target light strip reads the corresponding color data from the frame-slice control data and drives the corresponding lamp beads to operate.

12. The lamp controller according to claim 11, wherein before responding to a refresh time slot arrival event triggered periodically by a timer of a target light strip, the method further comprises:
  setting the timer corresponding to each light strip, configuring the refresh time slot of each light strip as a timing cycle of the timer of the light strip;
  starting the timer to time for each light unit according to the corresponding refresh time slot to trigger the corresponding refresh time slot arrival event;
  wherein, when the lighting-effect coordination mode is the synchronous playback mode, the timers of the light strips are synchronously started to time, and when the lighting-effect coordination mode is the sequential playback mode, according to the order of each light strip in the light strip group to which the light strip belongs and the number ratio of the number of light units of the light strip to the total number of light units of the entire light strip group, the relative time difference of the refresh time slots between the light strips is determined, and each timer is started according to the relative time difference.

13. A lamp, comprising a controller and a plurality of light strips, each light strip comprising a plurality of light units, wherein each light strip is independently connected to the controller and the controller is configured to perform the lighting-effect coordinated playback method according to claim 1.

* * * * *